(12) United States Patent　　　(10) Patent No.:　US 12,658,772 B2

Hashimoto　　　　　　　　　　　　　(45) Date of Patent:　Jun. 16, 2026

(54) CONTACT STRUCTURE AND BRUSH MOTOR

(71) Applicant: MABUCHI MOTOR CO., LTD., Chiba (JP)

(72) Inventor: Yasuhiro Hashimoto, Chiba (JP)

(73) Assignee: MABUCHI MOTOR CO., LTD., Chiba (JP)

( * ) Notice: Subject to any disclaimer, the term of this patent is extended or adjusted under 35 U.S.C. 154(b) by 246 days.

(21) Appl. No.: 18/339,236

(22) Filed: Jun. 22, 2023

(65) Prior Publication Data

US 2023/0421029 A1　　Dec. 28, 2023

(30) Foreign Application Priority Data

Jun. 27, 2022　(JP) ................................. 2022-102584

(51) Int. Cl.
H02K 13/00　　　(2006.01)

(52) U.S. Cl.
CPC .................................. H02K 13/006 (2013.01)

(58) Field of Classification Search
CPC .... H02K 13/006; H02K 13/105; H01R 39/20; H01R 39/04; H01R 39/26; H01R 2201/10
See application file for complete search history.

(56) References Cited

U.S. PATENT DOCUMENTS

| | | | | |
|---|---|---|---|---|
| 3,735,171 A | * | 5/1973 | Van De Griend | ..... H01R 43/08 310/237 |
| 4,240,830 A | | 12/1980 | Lee | |
| 4,574,215 A | * | 3/1986 | Mabuchi | ................ H01R 39/39 310/239 |
| 5,882,442 A | * | 3/1999 | Caron | ........................ C22C 9/02 420/472 |
| 11,303,082 B2 | * | 4/2022 | Hirabayashi | ......... H02K 13/105 |
| 2022/0024444 A1 | | 1/2022 | Gluck et al. | |

FOREIGN PATENT DOCUMENTS

| | | |
|---|---|---|
| JP | S53093604 U | 7/1978 |
| JP | S55077354 A | 6/1980 |
| JP | 2005020797 A | 1/2005 |
| JP | 2017028757 A | 2/2017 |
| JP | 2021158702 A | 10/2021 |

OTHER PUBLICATIONS

"World Web Archive NDL Internet Document Collection and Preservation Project," https://web.archive.org/web/20220626174136/https://www.kiyomine.co.jp/product/bronze/, Jun. 26, 2022, retrieved on Sep. 19, 2025, 2pp.

Office Action in JP Application No. 2022-102584, mailed Oct. 7, 2025, 6pp.

Office Action in JP Application No. 2022-102584, dated Mar. 31, 2026, 8pp.

* cited by examiner

*Primary Examiner* — Tulsidas C Patel
*Assistant Examiner* — Mohammed Ahmed Qureshi
(74) *Attorney, Agent, or Firm* — HAUPTMAN HAM, LLP

(57)　　　ABSTRACT

Regarding a contact structure and a brush motor, wear resistance of a commutator and a brush and an insulating property of a slit is improved. The disclosed contact structure includes a commutator formed of phosphor bronze and containing at least tin ranging from 1.0% or more to 9.0% or less by mass; and a brush formed of copper carbon and provided to come into contact with the commutator.

6 Claims, 3 Drawing Sheets

CONTACT STRUCTURE AND BRUSH MOTOR

RELATED APPLICATIONS

The present application claims priority to Japanese Application No. 2022-102584 filed Jun. 27, 2022, the disclosure of which is hereby incorporated by reference herein in its entirety.

BACKGROUND

Technical Field

The present disclosure relates to a contact structure and a brush motor including the contact structure.

Related Art

Typical in-vehicle electrical components mounted in automobiles of the related art are often designed to operate at a voltage of 12 V or 24 V supplied from an in-vehicle battery. On the other hand, in recent electric vehicles, hybrid vehicles, and the like, there are cases in which higher voltage power supply systems are applied. For example, in a mild hybrid vehicle developed by an automobile manufacturer of Europe and America, a power supply system is proposed for driving in-vehicle electrical components or the like using a 48-V in-vehicle battery (see, for example, US 2022/0024444 A). In light of this actual situation, even in small electrical components such as a brush motor (commutator motor) that incorporates a commutator and a brush, performance that can operate at a higher voltage than before is required.

SUMMARY

In a case where a brush motor is operated at a high voltage, the sparks of the contacts of the commutator and the brush becomes severe, which may cause rapid wear. In addition, a slit for ensuring insulating property is provided between the plurality of commutator pieces constituting the commutator. When abrasion powder is accumulated inside or near the slit, the insulating property of the slit is reduced, flash-over (short-circuit between the positive electrode brush and the negative electrode brush) occurs, and the abnormal stop of the motor due to welding between adjacent commutator pieces can occur.

In view of these issues, it is desirable to improve the wear resistance of the commutator and the brush and the insulating property of the slit in order to operate the brush motor at a higher voltage than before. Note that this issue cannot be said to be an issue to be solved only in in-vehicle electrical components mounted on a mild hybrid vehicle. That is, even in a typical electric apparatus other than in-vehicle electrical components, a similar issue occurs in a case where the electric apparatus is desired to be operated at a higher voltage.

One object of the present application to provide a contact structure and a brush motor created in light of the above issue and having improved wear resistance and slit insulating property of a commutator and a brush. Note that, without being limited to this object, the effect of operation derived from each configuration shown in "DETAILED DESCRIPTION" to be described later, which has an effect that cannot be obtained by the related art, can also be positioned as another object of the present application.

The disclosed contact structure includes a commutator formed of phosphor bronze and containing at least tin ranging from 1.0% or more to 9.0% or less by mass; and a brush formed of copper carbon and provided to come into contact with the commutator. Note that, the brush preferably contains copper ranging from 20% or more to 70% or less by mass.

In addition, the disclosed brush motor includes a rotor that is energized via the contact structure described above; and a stator that generates a magnetic field acting on the rotor. The brush motor drives an automobile in-vehicle electrical component including a power source having an input voltage to the brush motor of DC 36 V or more, and the rotor operates with voltage of the power source applied.

According to the disclosed technique, the durability of the commutator and brush can be improved by the combination of a commutator formed of phosphor bronze and a brush formed of copper carbon. In addition, by making at least tin contained in the commutator ranging from 1.0% or more to 9.0% or less, the conductivity of the wear powder can be reduced and the insulation reduction of the slit can be restrained. Therefore, wear resistance of the commutator and the brush and the insulating property of the slit can be improved.

DETAILED DESCRIPTION

The disclosed contact structure and brush motor may be implemented by the following embodiment. A contact structure refers to the structure of a portion through which current flows by bringing a plurality of parts into contact, or the structure of a portion that disconnects such a current flow (opens and closes a flow path of current). The disclosed contact structure includes at least a commutator and a brush. In addition, a brush motor refers to a motor including a rotor that is energized via a contact structure and a stator that generates a magnetic field acting on the rotor. The disclosed brush motor is also referred to as a commutator motor or a brushed motor. Note that the percentages (percent, %) of the various components referred to in this embodiment refer to percentages of mass (percentages by mass).

Embodiment

[1. Configuration]

Figure 1:
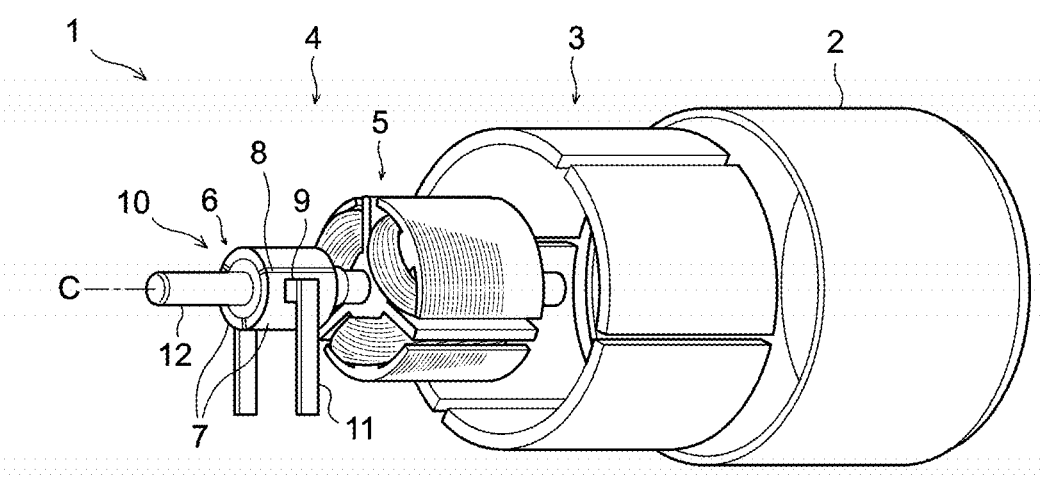
FIG. 1 is an exploded perspective view explaining a contact structure and a brush motor of an embodiment.

FIG. 1 is a perspective view illustrating a contact structure 10 as an embodiment and an exploded perspective view illustrating main components of a brush motor 1 to which the contact structure 10 is applied. The brush motor 1 is applied as a small motor for driving in-vehicle electrical components (for example, a door locking device, a mirror driving device, a mirror unit storing device, a power window device, a seat belt pretensioner device, and an electric parking brake device) for an automobile mounted with a power source of DC 36 V or more, for example. The power source of the brush motor 1 is, for example, a storage battery (DC power source).

The driving time of the brush motor 1 for driving an in-vehicle electrical component for an automobile is often less than 10 seconds. Note that the driving time per operation of the brush motor 1 used to drive a typical door locking device is less than 1 second and less than 10 seconds in a mirror unit storing device or a power window device. In such a brush motor 1, most of the electrical energy consumed to drive the door locking device, for example, is consumed at the start of the rotating operation (at the time of start-up). That is, in the brush motor 1 described above, a large current is likely to be input at the time of start-up. The contact structure 10 of the present embodiment exhibits a remarkable effect by being applied to such a brush motor 1 (in other words, a brush motor 1 having a relatively short driving time and to which a large current can be input at the time of start-up).

The brush motor 1 includes a stator 3 (fixed element), a rotor 4 (rotating element) disposed inside the stator 3, and a shaft 12 serving as a center of rotation of the rotor 4. The rotor 4 is a rotating element that is energized via the contact structure 10 as an embodiment, and is operated by applying voltage (36 V, 48V, and the like) of a power source mounted on an automobile, for example. The stator 3 and the rotor 4 are housed inside a housing 2 formed, for example, in a bottomed cylindrical shape. In FIG. 1, the description of a lid member (end bell) that closes an open end portion (the left end portion in FIG. 1) of the housing 2 is omitted. The size of the brush motor 1 is, for example, that the outer diameter of the housing 2 (case) is φ40 mm or less, and the output is 150 W or less. Preferably, the outer diameter of the housing 2 is φ25 mm or less, and the output is 25 W or less. In particular, the outer diameter of the commutator is φ10 mm or less. This is a significant effect of the present disclosure because the commutator is relatively small and is less likely to maintain the insulating property of the commutator against high voltage.

The shaft 12 is a shaft-shaped (rod-shaped) member supported by the housing 2 or its lid member via a bearing (not illustrated). The stator 3 is fixed to the housing 2, and the rotor 4 is fixed to the shaft 12 and rotates integrally with the shaft 12. A center line C of the shaft 12 coincides with the center of rotation of the rotor 4. In addition, one end of the shaft 12 is projected toward the outside of the housing 2. The rotational movement of the rotor 4 with respect to the stator 3 is output to the outside of the housing 2 via the shaft 12.

The stator 3 generates a magnetic field acting on the rotor 4 and includes a plurality of magnets (permanent magnets). The plurality of magnets is attached along an inner peripheral surface of the housing 2, for example, and different magnetic poles are disposed at a predetermined interval in a circumferential direction (in a circumferential direction of a circle centered on the center line C in a cross-section perpendicular to the center line C). The shape of each magnet may be, for example, a circular arc surface shape, an annular shape, or a similar shape. The direction of the magnetic field is set in the direction from the outside to the inside of the housing 2 or in the opposite direction (the direction from the inside to the outside). The number and shape of the magnets can be arbitrarily set.

The rotor 4 is provided with a core 5 (rotating element core) and a commutator 6 that are non-rotatably fixed to the shaft 12. The core 5 is formed by stacking, for example, a plurality of steel plates having the same shape. The stacking direction of the steel plates is the same as the extending direction of the center line C. The core 5 is provided with a plurality of teeth in a shape radially projecting from the center line C in the cross section perpendicular to the center line C. A plurality of coils is formed by winding an electric wire around each tooth. The number of teeth, the shape, the winding method of the electric wire, and the number of windings can be arbitrarily set.

The commutator 6 (commutator) is a member for generating an appropriate energization state corresponding to the rotation angle of the rotor 4 with respect to the energization states of the plurality of coils provided in the rotor 4. The commutator 6 includes a plurality of commutator pieces 7 (commutator pieces, or commutator segments) formed into a curved surface shape. The shape of the commutator pieces 7 is formed into, for example, a circular arc surface shape or a similar shape. The commutator pieces 7 are disposed at a predetermined interval in the circumferential direction along the outer peripheral surface of the shaft 12. Each of the commutator pieces 7 and each of the coils is connected by a feed circuit. In addition, the gap between the adjacent commutator pieces 7 is also referred to as a slit 8. The number and the shape of the commutator pieces 7 and the width and the shape of the slit 8 can be arbitrarily set.

A brush 9 is provided around the commutator 6 to make sliding contact with the surface of the commutator piece 7. The brush 9 is attached to one end of a brush arm 11 and is supported by the brush arm 11 while being elastically pressed against the commutator piece 7. In addition, a pair of brushes 9 and brush arms 11 are provided. The other end of each of the brush arms 11 penetrates through, for example, the housing 2 and the lid member and extends to the outside of the housing 2, and each is connected to terminals (+terminal and −terminal) for power supply. Each of the brushes 9 is usually in contact with any one or two adjacent commutator pieces 7, and is disposed in a manner that the plurality of brushes 9 having different electrical polarities do not come into contact with one commutator piece 7.

[2. Composition]

The commutator 6 is formed of phosphor bronze. The "phosphor bronze" here is an alloy containing at least phosphorus (P), tin (Sn) and copper (Cu). Preferably, the content rate of each component is set in a manner that the total of phosphorus, tin, and copper occupies at least 99.5% of the whole. The phosphorus content rate can be arbitrarily set, for example, to 0.35% or less, preferably 0.20% or less, more preferably or less, and still more preferably 0.080% or less. Note that the content rate of phosphorus greater than 0.35% may be set.

Note that the "phosphor bronze" herein may be a component mainly containing copper. The definition of copper-based phosphor bronze includes, for example, "phosphor bronze containing 90% or more of copper", "phosphor bronze containing 50% or more of copper", and "phosphor bronze having the highest copper content rate". In addition, phosphor bronze can contain components other than phosphorus, tin, and copper. For example, lead (Pb), iron (Fe), zinc (Zn), nickel (Ni), and the like may be contained.

The commutator 6 of the present embodiment contains tin ranging from 1.0% (for example, a tin content rate lower limit corresponding to JIS C5050) or more to 9.0% (for example, a tin content rate upper limit value equivalent to JIS C5212) or less. By increasing the content rate of tin, the conductivity of the abrasion powder (mixture of commutator powder and brush powder) caused by the physical contact between the commutator 6 and the brush 9 is reduced, and the insulation reduction of the slit 8 is restrained. The lower limit of the tin content rate can be arbitrarily set in a range of 1.0% or more, but is preferably 3.5% (for example, JIS C5111). In the commutator 6, the melting point of the commutator piece 7 is lowered by increasing the content rate of tin. This makes it easier for the commutator piece 7 near the slit 8 to be worn by the sparks at the time of switching, and the wear powder is less likely to be accumulated. Thus, the insulating property of the slit 8 is improved.

On the other hand, when the content rate of tin is excessively increased, the wear of the commutator piece 7 near the slit 8 is excessively advanced. Therefore, when the brush 9 slides the commutator 6, the brush 9 bounces and the contact becomes unstable near the slit 8, which may lead to poor current input and lower performance. In view of such an actual situation, the preferred upper limit value for tin content rate is around 9.0%. In other words, the tin content rate is preferably 9.0% or less, and is more preferably 4.5% or less (for example, C5111 to C5212).

The brush 9 is formed of copper carbon. The "copper carbon" here is a composite material containing at least copper (Cu) and carbon (C), and is formed by fixing or sintering, for example, powdery graphite or copper powder with a known bonding material (binder). In the brush 9, the specific resistance of the brush 9 increases by decreasing the copper content rate, and the conductivity of the wear powder decreases, further restraining the insulation reduction of the slit 8. On the other hand, when the copper content rate is too low, the conductivity of the brush 9 itself is reduced, and good conductive performance may not be obtained. According to the consideration results of the inventors, the preferred range of the copper content rate is from 20% or more and 70% or less. Note that copper carbon may contain components other than copper and carbon. For example, a solid lubricant, an abrasive, and the like may be contained.

[3. Durability Test]

Figure 2:
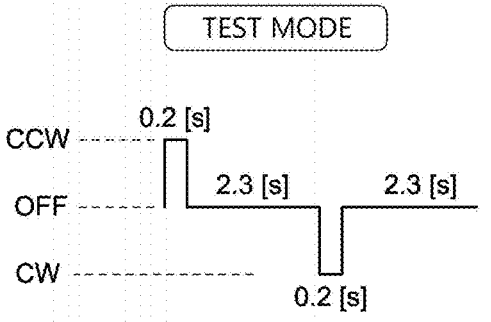
FIG. 2 is a diagram explaining contents of a durability test.

FIG. 2 is a schematic diagram illustrating a cycle (periodic variation) of voltage applied to the rotor 4 in a durability test of the contact structure 10 and the brush motor 1. The CW in the figure represents the voltage (normal rotation voltage) that causes the rotor 4 to rotate clockwise, the CCW in the figure represents the voltage (reverse rotation voltage) that causes the rotor 4 to rotate counter-clockwise, and the OFF in the figure represents a non-energized state (0 V). In this durability test, the durability of the contact structure 10 and the brush motor 1 was measured by repeatedly applying voltage as illustrated in FIG. 2 to the rotor 4. In this durability test, a predetermined load may be applied to the rotor 4 by connecting a device to be driven by the brush motor 1 (for example, a door locking device for an automobile) to the shaft 12.

In one cycle of the durability test illustrated in FIG. 2, after the reverse rotation voltage was applied for 0.2 seconds, the non-energized state was continued for 2.3 seconds, and after the forward voltage was applied for 0.2 seconds, the non-energized state was continued for 2.3 seconds. In such a cycle, driving of the rotor 4 was repeatedly performed, and the repeated number of times was measured. The number of times (number of cycles) until an issue occurred in the operation of contact structure 10 and brush motor 1 (for, no motion) was evaluated as the life of the contact structure 10 and the brush motor 1. The target values of the specific energization time, voltage, and lifetime can be arbitrarily set.

Figures 3A, 3B:
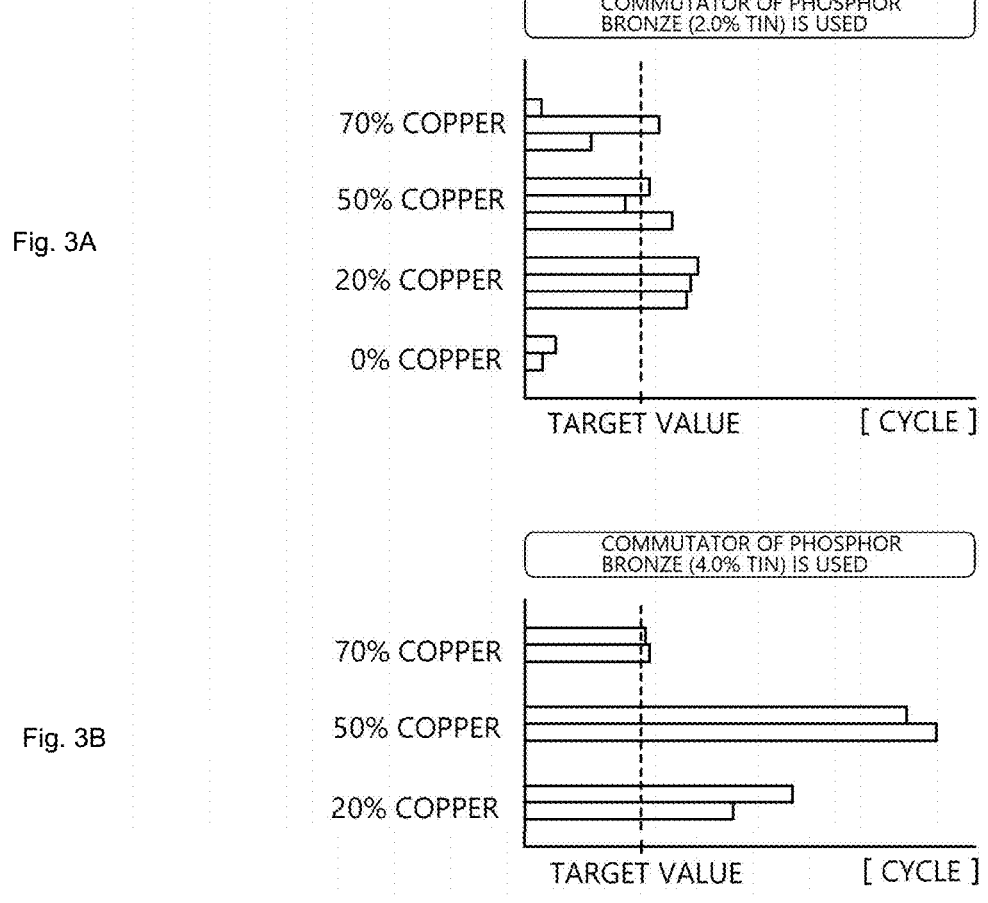
FIGS. 3A and 3B are graphs explaining test results.

FIG. 3A is a graph illustrating the results of a durability test by a combination of the brush 9 and the commutator 6 formed of phosphor bronze [2.0% tin (1.7 to 2.3%), manufactured by Furukawa Electric Co., Ltd., product name MF 202]. Here, the results of the plurality of durability tests performed by changing the copper content rate contained in the brush 9 are collectively illustrated. That is, in order from the top in FIG. 3A, the result of a case where the copper content rate is 70%, the result of a case where the copper content rate is 50%, the result of the case where the copper content rate is 20%, and the result of the case where the brush 9 does not contain copper are illustrated.

According to FIG. 3A, it can be seen that a combination of the commutator 6 formed of phosphor bronze [2.0% tin (1.7 to 2.3%)] and the brush 9 formed of copper carbon can be effective for extending the life. In addition, the copper content rate contained in the brush 9 preferably ranges from 20 to 70%, and it can be seen that the life is extended as the copper content rate decreases. In particular, when the content rate of copper contained in the brush 9 ranges from 20 to 50%, it can be seen that the life is more reliably extended.

FIG. 3B is a graph illustrating the results of a durability test by a combination of the brush 9 and the commutator 6 formed of phosphor bronze [4.0% tin (3.5 to 4.5%)]. Here, in order from the top in FIG. 3B, the result of a case where the copper content rate is 70%, the result of a case where the copper content rate is 50%, and the result of a case where the copper content rate is 20% are illustrated.

Also in FIG. 3B, it can be seen that a combination of the commutator 6 formed of phosphor bronze [4.0% tin (3.5 to 4.5%)] and the brush 9 formed of copper carbon can be effective for extending the life. In addition, the copper content rate contained in the brush 9 preferably ranges from 20 to 70%, and it can be seen that the life is extended as the copper content rate decreases. In particular, when the content rate of copper contained in the brush 9 ranges from 20 to 50%, it can be seen that the life extension effect is high.

Figures 4A, 4B:
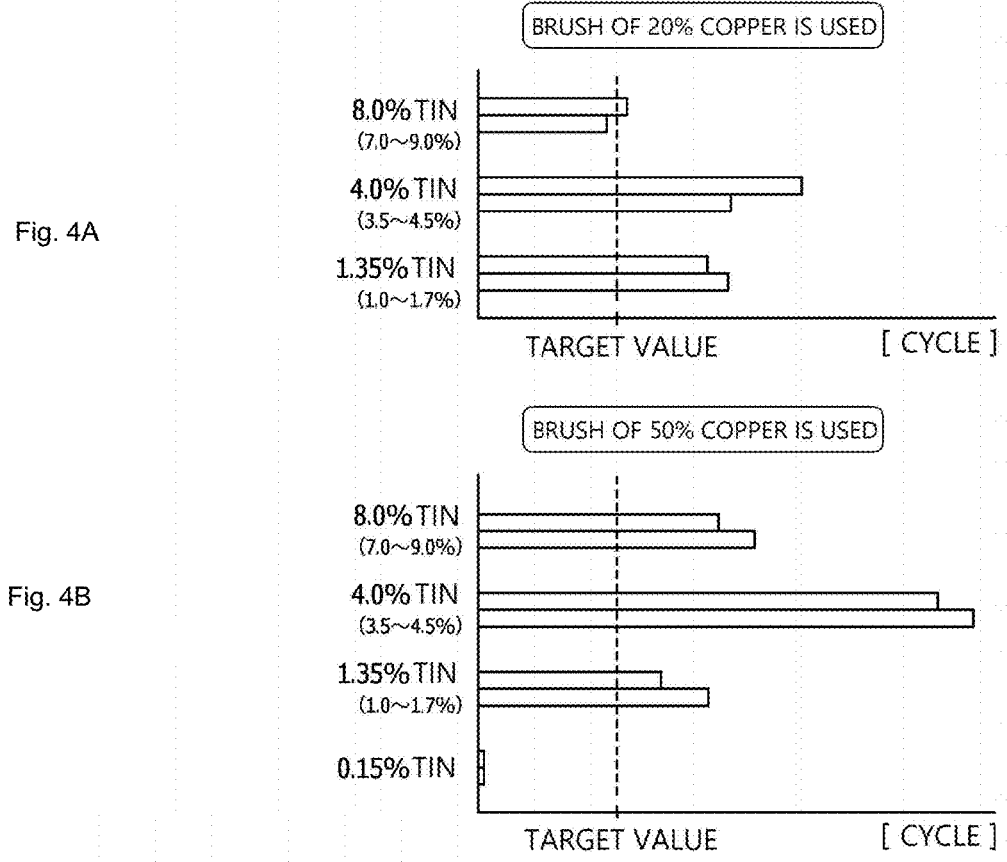
FIGS. 4A and 4B are graphs explaining test results.

FIG. 4A is a graph illustrating the results of a durability test by a combination of the commutator 6 and the brush 9 having a copper content rate of 20%. Here, the results of the plurality of durability tests performed by changing the tin content rate contained in the commutator 6 are collectively illustrated. That is, in order from the top in FIG. 4A, the result of a case where the tin content rate is 8.0% (7.0 to 9.0%), the result of a case where the tin content rate is 4.0% (3.5 to 4.5%), and the result of a case where the tin content rate is 1.35% (1.0 to 1.7%) are illustrated. According to FIG. 4A, in a case where the brush 9 having a copper content rate of 20% is used, it can be seen that use of the commutator 6 having a tin content rate ranging from approximately 1.0 to 9.0% (preferably 3.5 to 4.5%) is desirable.

FIG. 4B is a graph illustrating the results of a durability test by a combination of the commutator 6 and the brush 9 having a copper content rate of 50%. Regarding the conditions other than the copper content rate in the brush 9, the top three in FIG. 4B are the same as those illustrated in FIG. 4A. The bottom graph of FIG. 4B illustrates the results of a case where the tin content rate is 0.15% (a case of a material with little tin added). According to FIG. 4B, in a case where the brush 9 having a copper content rate of 50% is used, it can be seen that use of the commutator 6 having a tin content rate ranging from approximately 1.0 to 9.0% (preferably 3.5 to 4.5%) is desirable. In addition, in a case where the commutator 6 using a material with little tin added is used, it can be seen that the life is significantly shortened.

[4. Effects]

(1) The disclosed contact structure 10 according to the present embodiment includes a commutator 6 and a brush 9. The commutator 6 is formed of phosphor bronze and contains at least tin ranging from 1.0% or more to 9.0% or less by mass. The brush 9 is formed of copper carbon. The durability of the commutator 6 and the brush 9 can be improved by the combination of the commutator 6 formed of phosphor bronze and the brush 9 formed of copper carbon. Specifically, by making tin contained in the commutator 6 by 1.0% or more, the conductivity of the wear powder can be reduced and the insulation reduction of the slit 8 can be restrained. Therefore, wear resistance of the commutator 6 and the brush 9 and the insulating property of the slit 8 can be improved.

(2) In addition, the brush 9 described above contains copper by 20% or more and 70% or less by mass. With such a configuration, it is possible to reduce the conductivity of the wear powder and further restrain the insulation reduction of the slit 8 while ensuring the conductivity of the brush 9 to a certain degree. Therefore, wear resistance of the commutator 6 and the brush 9 and the insulating property of the slit 8 can be improved.

(3) The brush motor 1 according to the present embodiment includes a rotor 4 that is energized via the contact structure 10 described above; and a stator 3 that generates a magnetic field acting on the rotor 4. With such a configuration, the life of the contact structure 10 included in the brush motor 1 can be extended, and consequently, the life and durability of the brush motor 1 can be improved.

(4) In addition, the brush motor 1 described above is applied as the brush motor 1 for an automobile in-vehicle electrical component including a power source having an input voltage to the motor 1 of DC 36 V or more for example, and the rotor 4 can operate with voltage of the power source applied. Thus, in the brush motor 1 for an automobile that is required to have a performance that can operate at high voltage than before, the life of the contact structure 10 can be extended, and consequently, the life and durability of the brush motor 1 can be improved. Note that, in the brush motor 1 to which a voltage of 48 V or more can be applied, the motor life may be significantly shortened due to the voltage. For such an issue, the brush motor 1 described above has a significant improvement effect (extension effect of motor life).

[5. Other]

The above embodiments are merely exemplary and are not intended to preclude the application of various modifications and techniques that are not explicitly described in the present embodiment. Each configuration in the present embodiment can be implemented in various ways without departing from the gist. In addition, each configuration of the present embodiment can be selected as required or can be appropriately combined with various configurations included in the known technique.

For example, the content rate of copper contained in the brush 9 may be set to less than 20% and greater than 50%. In the combination of at least the commutator 6 formed of phosphor bronze and the brush 9 formed of copper carbon, actions and effects similar to those of the above embodiment can be obtained by setting the content rate of tin contained in the commutator 6 to a range from 1.0% or more to 9.0% or less.

The present application is applicable to the manufacturing industry of electric parts and electrical components including contact structures with a commutator and a brush. In addition, the present application is applicable to the manufacturing industry of a brush motor including the above contact structure.

DESCRIPTION OF REFERENCE SIGNS

1 brush motor
2 housing
3 stator
4 rotor
5 core
6 commutator
7 commutator piece
8 slit
9 brush
10 contact structure
11 brush arm
12 shaft
C center line

What is claimed is:

1. A contact structure comprising:
a commutator formed of phosphor bronze and containing at least tin ranging from 1.0% or more to 9.0% or less by mass; and
a brush formed of copper carbon and provided to come into contact with sliding surface the commutator, the sliding surface being made of phosphor bronze and containing at least tin ranging from 1.0% or more to 9.0% or less by mass.

2. The contact structure according to claim 1, wherein the brush contains copper ranging from 20% or more to 70% or less by mass.

3. A brush motor comprising:
a rotor that is energized via the contact structure according to claim 1; and
a stator that generates a magnetic field acting on the rotor.

4. A brush motor comprising:
a rotor that is energized via the contact structure according to claim 2; and
a stator that generates a magnetic field acting on the rotor.

5. The contact structure according to claim 1, wherein the commutator including the sliding surface is formed of phosphor bronze and contains at least tin ranging from 3.5% or more to 9.0% or less by mass.

6. A brush motor comprising:
a rotor that is energized via the contact structure according to claim 5; and
a stator that generates a magnetic field acting on the rotor.

* * * * *